Patented May 25, 1954

2,679,502

UNITED STATES PATENT OFFICE 2,679,502

PROCESS FOR THE PREPARATION OF COMPOUNDS OF THE CYCLOPENTANOPOLYHYDROPHENANTHRENE SERIES

Karl Miescher, Riehen, and Charles Meystre, Basel, Switzerland, assignors to Ciba Pharmaceutical Products, Inc., Summit, N. J.

No Drawing. Application December 27, 1950, Serial No. 203,021

Claims priority, application Switzerland November 17, 1948

3 Claims. (Cl. 260—397.4)

This application is a continuation-in-part of our copending application Serial No. 126,054, filed on November 7, 1949, now Patent No. 2,623,885.

The invention relates to the preparation of compounds of the cyclopentanopolyhydrophenanthrene series by reduction of keto groups of compounds of the said series with lithium-boron hydride or sodium-boron hydride, in which process a 3-positioned $\alpha$:$\beta$-unsaturated keto-grouping present is not hydrogenated.

According to the present invention $\alpha$:$\beta$-unsaturated 3-ketones of the cyclopentanopolyhydrophenanthrene series are temporarily converted into their enol ethers or cyclic acetals for protection of the 3-positioned keto group and treated, for the purpose of reduction of keto groups, with lithium-boron hydride or sodium-boron hydride.

The $\alpha$:$\beta$-unsaturated ketones of the cyclopentanopolyhydrophenanthrene series, which contain as reducible substituents a keto group, may be converted into any convenient enol ether or cyclic acetal. Suitable enol ethers are those of the aliphatic, alicyclic or araliphatic series; in particular alkyl ethers are employed, as for example, methyl, ethyl or propyl ethers. There may be particularly mentioned the enol ethers of $\Delta^4$-3:17-androstendione. In the manufacture of the cyclic acetals of these starting materials, particularly of the ethylene glycol, there are used the 1,2-diols or the corresponding alkylene oxides in the presence of an acid catalyst.

The reduction is advantageously carried out in the presence of an indifferent solvent in which the light metal-light metal hydride is soluble, in particular in the presence of ether, or also of tetrahydrofurane, butyl ether or benzene or of mixtures of such diluents, such as in the presence of a mixture of ether and benzene. When sodium-boron hydride is used as reducing agent, it is advantageous to work in the presence of water, using e. g. a mixture of methanol, dioxane and water.

The enol ethers or cyclic acetals of hydroxyketones obtained in the course of this process can be hydrolyzed in the customary manner in order to produce the corresponding ketones.

Some of the ketones obtained merit application as therapeutic media. They may also be employed as intermediate products for the manufacture of therapeutically valuable compounds.

The following examples illustrate the invention, the parts being by weight unless otherwise stated and the relationship between parts by weight and parts by volume being the same as that between the kilogram and liter:

Example 1

2 parts of the 3-ethyl enol ether of $\Delta^4$-3:17-androstendione are dissolved in 200 parts by volume of dry ether and slowly added, with exclusion of moisture, to a well stirred mixture of 0.5 part of lithium-boron hydride in 100 parts by volume of dry ether. The solution produced is further stirred for 15 minutes and thereupon carefully treated with 20 parts by volume of water and 40 parts by volume of 10 per cent. sulfuric acid. The ethereal solution is then washed with water, dried and evaporated. The crude enol ether of $\Delta^4$-3-keto-17-hydroxy-androstene is, without further purification, dissolved in 100 parts by volume of alcohol and the solution treated with 10 parts by volume of 2N-hydrochloric acid and allowed to stand for 24 hours. The solution is thereupon evaporated in vacuum and in this manner the crude $\Delta^4$-3-keto-17-hydroxy-androstene (testosterone) obtained, which can be purified in the customary manner. For example, from diluted acetone needles are obtained of melting point 152–153° C.

$$([\alpha]_D^{19} = +109°$$

in ethanol).

Example 2

10 parts of the 3-ethyl enol ether of $\Delta^4$-3:17-androstendione are dissolved in 220 parts by volume of methanol and slowly added to a well stirred solution of 1.5 parts of sodium-boron hydride in 40 parts by volume of methanol. Thereupon the mixture is refluxed for ½ hour. 45 parts of 10 per cent. potassium carbonate are added and the mixture is stirred and refluxed for 1 hour. Then the mixture is made acid to Congo red with dilute sulfuric acid and refluxed for 1 hour. Methanol is removed completely under reduced pressure. The mixture is then cooled and crude testosterone filtered, yield 97 per cent. By crystallizing this product once from diluted acetone pure testosterone of melting point 152–153° C. is obtained.

Having thus described the invention, what is claimed is:

1. Process for the reduction of compounds of the cyclopentanopolyhydrophenanthrene series, which comprises treating a $\Delta^4$-3-keto compound of the said series, which contains as a further substituent an oxo group, in the form of a member of the group consisting of 3-enol-ethers and 3-cyclic acetals, with a member selected from the group consisting of lithium-boron hydride and sodium-boron hydride and hydrolyzing the so formed reaction product whereby the $\Delta^4$-3-keto compound with the reduced further substituent is obtained.

2. Process for the reduction of compounds of the cyclopentanopolyhydrophenanthrene series, which comprises treating a 3-enol-ether of $\Delta^4$-androstene-3,17-dione with sodium-boron hydride and hydrolyzing the so formed reaction product, whereby $\Delta^4$-3-keto-17-hydroxy-androstene is obtained.

3. Process for the reduction of compounds of the cyclopentanopolyhydrophenanthrene series, which comprises treating a 3-cyclic acetal of $\Delta^4$-androstene-3,17-dione with sodium-boron hydride and hydrolyzing the so formed product, whereby $\Delta^4$-3-keto-17-hydroxy-androstene is obtained.

References Cited in the file of this patent

UNITED STATES PATENTS

| Number | Name | Date |
|---|---|---|
| 2,294,433 | Westphal | Sept. 1, 1942 |
| 2,588,294 | Rosenkranz | Mar. 4, 1952 |

OTHER REFERENCES

Chaikin et al., Journal Am. Chem. Soc. 71, 122–125 (1949).